US011974367B2

(12) United States Patent
Wang et al.

(10) Patent No.: US 11,974,367 B2
(45) Date of Patent: Apr. 30, 2024

(54) LIGHTING DEVICE

(71) Applicant: DELTA ELECTRONICS, INC., Taoyuan (TW)

(72) Inventors: Chih-Hsien Wang, Taoyuan (TW); Ming-Chieh Cheng, Taoyuan (TW); Po-Yen Chen, Taoyuan (TW); Shih-Chieh Chang, Taoyuan (TW); Kuan-Hsien Tu, Taoyuan (TW); Xiu-Yi Lin, Taoyuan (TW); Ling-Chun Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/937,785

(22) Filed: Oct. 4, 2022

(65) Prior Publication Data

US 2023/0337340 A1 Oct. 19, 2023

(30) Foreign Application Priority Data

Apr. 13, 2022 (CN) ......................... 202210385130.6

(51) Int. Cl.
*H05B 45/10* (2020.01)
*H05B 45/32* (2020.01)
*H05B 47/155* (2020.01)

(52) U.S. Cl.
CPC ............. *H05B 45/10* (2020.01); *H05B 45/32* (2020.01); *H05B 47/155* (2020.01)

(58) Field of Classification Search
CPC ....... H05B 45/10; H05B 45/32; H05B 47/155
See application file for complete search history.

(56) References Cited

U.S. PATENT DOCUMENTS

| | | | | |
|---|---|---|---|---|
| 2010/0231136 | A1* | 9/2010 | Reisenauer | H05B 45/3725 315/276 |
| 2013/0200817 | A1 | 8/2013 | Gray et al. | |
| 2013/0221869 | A1* | 8/2013 | Volk | H02M 1/15 315/250 |
| 2013/0221871 | A1* | 8/2013 | King | H05B 45/10 315/254 |
| 2014/0232288 | A1* | 8/2014 | Brandes | H05B 45/48 315/250 |
| 2020/0008278 | A1 | 1/2020 | Bouchard et al. | |

(Continued)

FOREIGN PATENT DOCUMENTS

| | | | |
|---|---|---|---|
| CN | 203671357 | U | 6/2014 |
| CN | 109890113 | A | 6/2019 |
| CN | 111629490 | A | 9/2020 |

(Continued)

*Primary Examiner* — Minh D A
(74) *Attorney, Agent, or Firm* — CKC & Partners Co., LLC

(57) ABSTRACT

A lighting device includes a light board and a light dimmer circuit. The light board includes multiple first light emitting elements and second light emitting elements. The first light emitting elements are disposed in a first area of the light board. The second light emitting elements are disposed in a second area of the light board. The light dimmer circuit is configured to drive the second light emitting elements to generate flickering lights from the second area of the light board, and is configured to drive the first light emitting elements to generate non-flickering lights from the first area of the light board.

16 Claims, 10 Drawing Sheets

(56) References Cited

U.S. PATENT DOCUMENTS

| | | | |
|---|---|---|---|
| 2020/0236746 | A1 | 7/2020 | Shao |

FOREIGN PATENT DOCUMENTS

| | | | |
|---|---|---|---|
| CN | 112804781 | A | 5/2021 |
| TW | 201349927 | A | 12/2013 |
| TW | 201448666 | A | 12/2014 |
| WO | 2020209532 | A2 | 10/2020 |

* cited by examiner

LIGHTING DEVICE

CROSS-REFERENCE TO RELATED APPLICATION

This application claims priority to China Application Serial Number 202210385130.6, filed Apr. 13, 2022, which is herein incorporated by reference in its entirety.

BACKGROUND

Field of Invention

The present invention relates to a lighting device. More particularly, the present invention relates to a lighting device with flickering functions.

Description of Related Art

In nowadays techniques of light boards, the stability of driving currents provided for light emitting elements are usually improved to stable the intensity of emitted lights and to avoid flicker. However, for some special purposes, the light emitting elements are controlled to provide flickering lights at a certain frequency, and therefore it may loss some advantages related to lights without flicker. Hence, how to design a lighting device able to control the light emitting elements to provide flickering lights at the specific frequency, and combine the advantages related to the lights without flicker is an issue deserved to be studied.

SUMMARY

To achieve the aforesaid purpose, one aspect of the present disclosure is related to a lighting device. The lighting device includes a light board and a light dimmer circuit. The light board includes a plurality of first light emitting elements and a plurality of second light emitting elements. The first light emitting elements are disposed in a first area of the lighting device. The second light emitting elements are disposed in a second area of the lighting device. The light dimmer circuit is configured to drive the second light emitting elements to generate flickering lights from the second area of the lighting device, and configured to drive the first light emitting elements to generate non-flickering lights from the first area of the lighting device.

The other aspect of the present disclosure is related to a lighting device. The lighting device includes a light board and a light dimmer circuit. The light board includes a plurality of first light emitting elements and a plurality of second light emitting elements. The light dimmer circuit is configured to drive the first light emitting elements by a pure DC voltage/current, and configured to drive the second light emitting elements by a pulse DC voltage/current.

Summary, the present disclosure utilizes the light dimmer circuit to drive the first light emitting elements to generate the non-flickering lights and to drive the second light emitting elements disposing in the same light board to generate the flickering lights.

BRIEF DESCRIPTION OF THE DRAWINGS

The present invention can be more fully understood by reading the following detailed description of the embodiment, with reference made to the accompanying drawings as follows.

DETAILED DESCRIPTION

Figure 1:
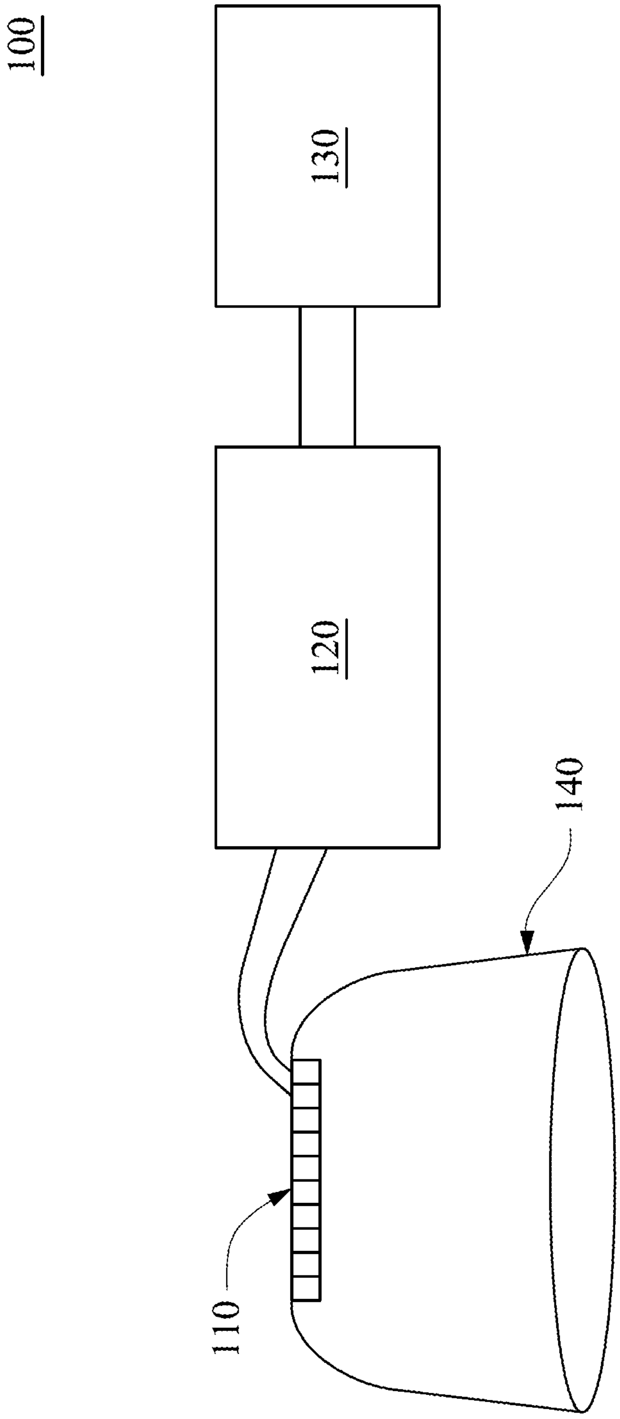
FIG. 1 is a schematic diagram of a lighting system in accordance with one embodiment of the present disclosure.

Reference is made to FIG. 1. FIG. 1 is a schematic diagram of a lighting device 100. As shown in FIG. 1, the lighting device 100 includes a lamp 140, a light board 110, a light dimming circuit 120 and a power supply circuit 130. In some embodiments, the light board 110 can be implemented by light emitting diode light board. In other embodiments, the light board 110 can be implemented by mini light emitting diode light board or other light emitting element. Therefore, it is not intended to limit the present disclosure.

In some embodiments, the power supply circuit 130 can be implemented by the mains electricity or AC electricity. In other embodiments, the power supply circuit 130 can be implemented by the DC electricity, such as, the DC current provided by an electrical device through a universal serial bus interface. The light dimming circuit 120 is configured to convert the power supplied by the power supply circuit 130 to a pure direct-current voltage/current and a pulse direct-current voltage/current to drive the light board 110 to emit lights.

Figure 2:
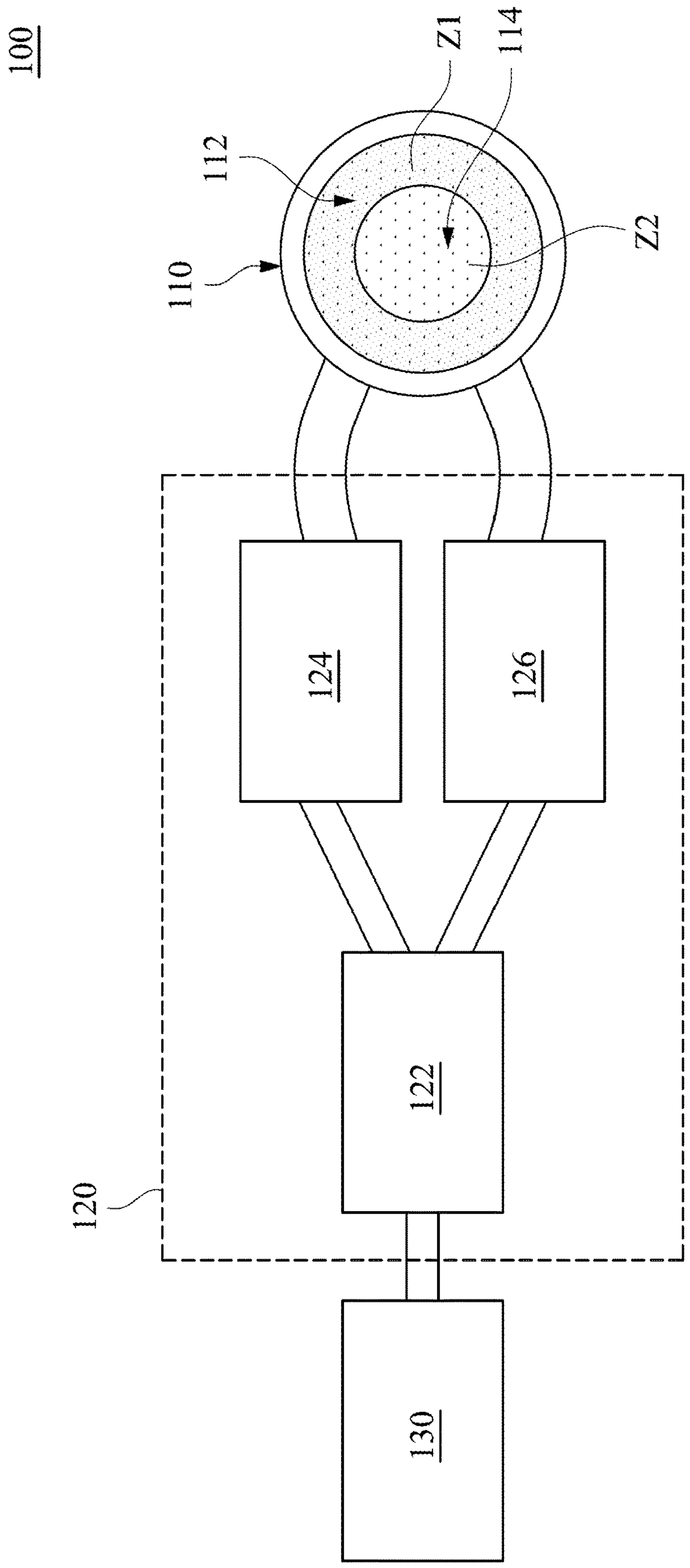
FIG. 2 is a function block of the lighting system in accordance with one embodiment of the present disclosure.

Reference is made to FIG. 2. FIG. 2 is a function block of the lighting device 100 in accordance with one embodiment of the present disclosure. As shown in FIG. 2, the lighting device 100 includes a light board 110, a light dimming circuit 120 and a power supply circuit 130. The light board 110 includes multiple light emitting elements 112 disposing in a first area Z1 of the light board 110 and multiple light emitting elements 114 disposing in a second area Z2 of the light board 110. The first area Z1 is outside of/surrounded around the second area Z2.

The light dimming circuit 120 includes a power conversion circuit 122, a pure direct-current (DC) voltage/current generating circuit 124 and a pulse direct-current (DC) voltage/current generating circuit 126. In some embodiments, the power conversion circuit 122 can be implemented by a AC-DC conversion circuit or a DC-DC conversion circuit, so as to buck and rectifier the AC/DC power transmitted from the power supply circuit 130, and output DC power to the pure DC voltage/current generating circuit 124 and the pulse DC voltage/current generating circuit 126.

The pure DC voltage/current generating circuit 124 is configured to generate pure DC voltage/current to drive the light emitting elements 112 disposing in the light board 110 to provide/generate non-flickering lights. The pulse DC voltage/current generating circuit 126 is configured to generate pulse DC voltage/current to drive the light emitting elements 114 disposing in the light board 110 to provide/generate flickering lights. The aforesaid flickering lights have a flicker frequency which can be perceptible by human visual system. The aforesaid non-flickering lights can be considered as non-visible-flickering lights which may include non-visible-flicker which is hard to be perceptible by human visual system. In some embodiments, the aforesaid flicker frequency of the flickering lights has benefits to treat or improve certain diseases, or to provide some stimulation for human brain. In some embodiments, the flicker frequency can be set at 40 Hz, so as to treat, improve or prevent brain function decline, such as, degenerative nerve disease (e.g. Alzheimer's disease) or neurodegenerative disease.

To be noted that, since the light emitting elements 112 in the first area Z1 of the light board 110 are disposed outside of/surrounded around the light emitting elements 114 in the second area Z2, and the light emitting elements 112 disposing on the periphery of the light board 110 is driven by the pure DC voltage/current to emit/generate the non-flickering lights, so as to decrease the uncomfortable feelings in human's visual caused from the flickering light. And, the human visual perception for the flickering-lights can be decreased, while maintaining the benefits for treating, improving or preventing brain function decline, such as, degenerative nerve disease (e.g. Alzheimer's disease) or neurodegenerative disease.

Figure 3:
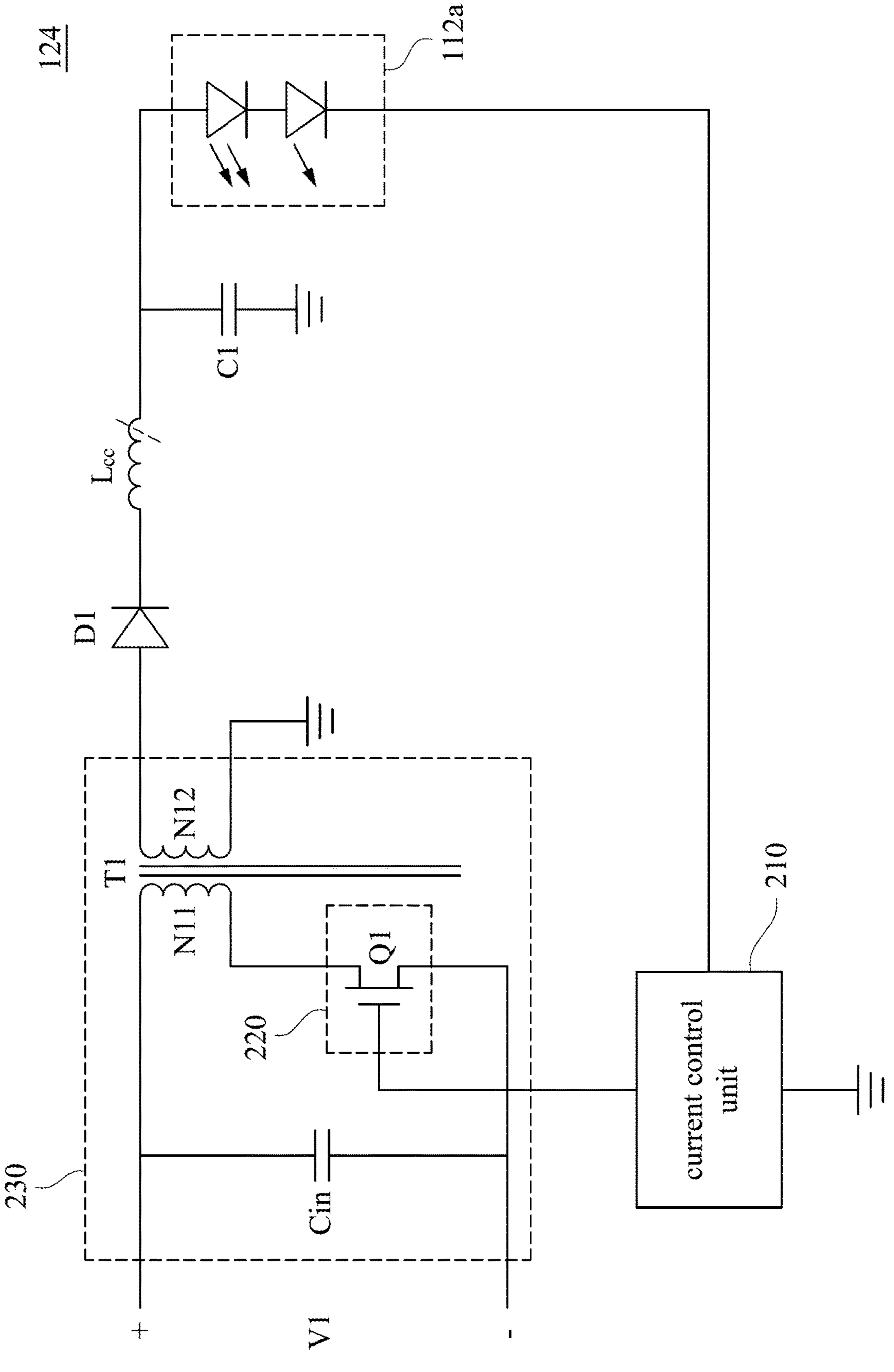
FIG. 3 is a schematic diagram of a pure DC voltage/current generating circuit in FIG. 2 in accordance with one embodiment of the present disclosure.

Reference is made to FIG. 3. FIG. 3 is a schematic diagram of a pure DC voltage/current generating circuit 124 in FIG. 2 in accordance with one embodiment of the present disclosure. As shown in FIG. 3, the pure DC voltage/current generating circuit 124 includes a DC-DC conversion circuit 230, a diode D1, an inductor $L_{cc}$, a capacitor C1 and a current control unit 210.

The DC-DC conversion circuit 230 includes an input capacitor Cin, a switch circuit 220 and a first transformer T1. The input capacitor Cin is connected to an input terminal of the DC-DC conversion circuit 230, and is configured to receive the DC supply voltage V1 provided form the power conversion circuit 122. The current control unit 210 is configured to control the switching frequency of the switch circuit 220 (the switch Q1), so as to transmit the pulse current through the primary winding coil N11 and the secondary winding coil N12 of the transformer T1 to a first terminal of the diodeD1, such that the diodeD1, the inductor $L_{cc}$ and the capacitor C1 converts the pulse current to a pure DC voltage/current and provides the pure DC voltage/current to the light emitting elements 112*a*. The light emitting elements 112*a* can correspond to the light emitting elements 112 in FIG. 2.

Figure 4:
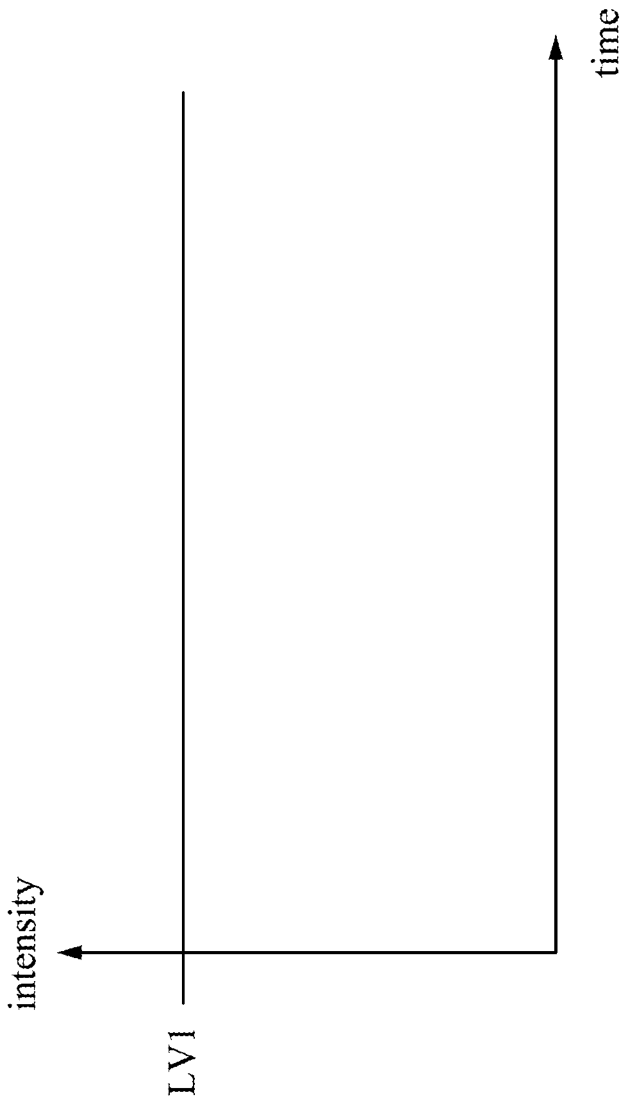
FIG. 4 is a schematic diagram of intensity of lights emitted by the light emitting elements driven by the pure DC voltage/current generating circuit in FIG. 2 in accordance with one embodiment of the present disclosure.

Reference is made to FIG. 4. FIG. 4 is a schematic diagram of intensity LV1 of lights emitted by the light emitting elements 112 driven by the pure DC voltage/current generating circuit in FIG. 2 in accordance with one embodiment of the present disclosure. As shown in FIG. 4, since the pure DC voltage/current generating circuit 124 provides the pure DC voltage/current to drive the light emitting elements 112 in the light board 110, the lights emitted by the light emitting elements 112 can be maintained at intensity LV1, such that the light emitting elements 112 can emit non-flickering lights. In some embodiments, the pure DC voltage/current generating circuit 124 can control the amplitude of the pure DC voltage/current, so as to adjust the intensity LV1 of the light emitting elements 112 based on the amplitude of the pure DC voltage/current.

To be noted that, in the embodiments of FIG. 3, the circuit architecture of the pure DC voltage/current generating circuit 124 is an example. The pure DC voltage/current generating circuit 124 of the light dimming circuit 120 can be implemented by other circuit able to generate the pure DC voltage/current. Therefore, it is not intended to limit the present disclosure.

Figure 5:
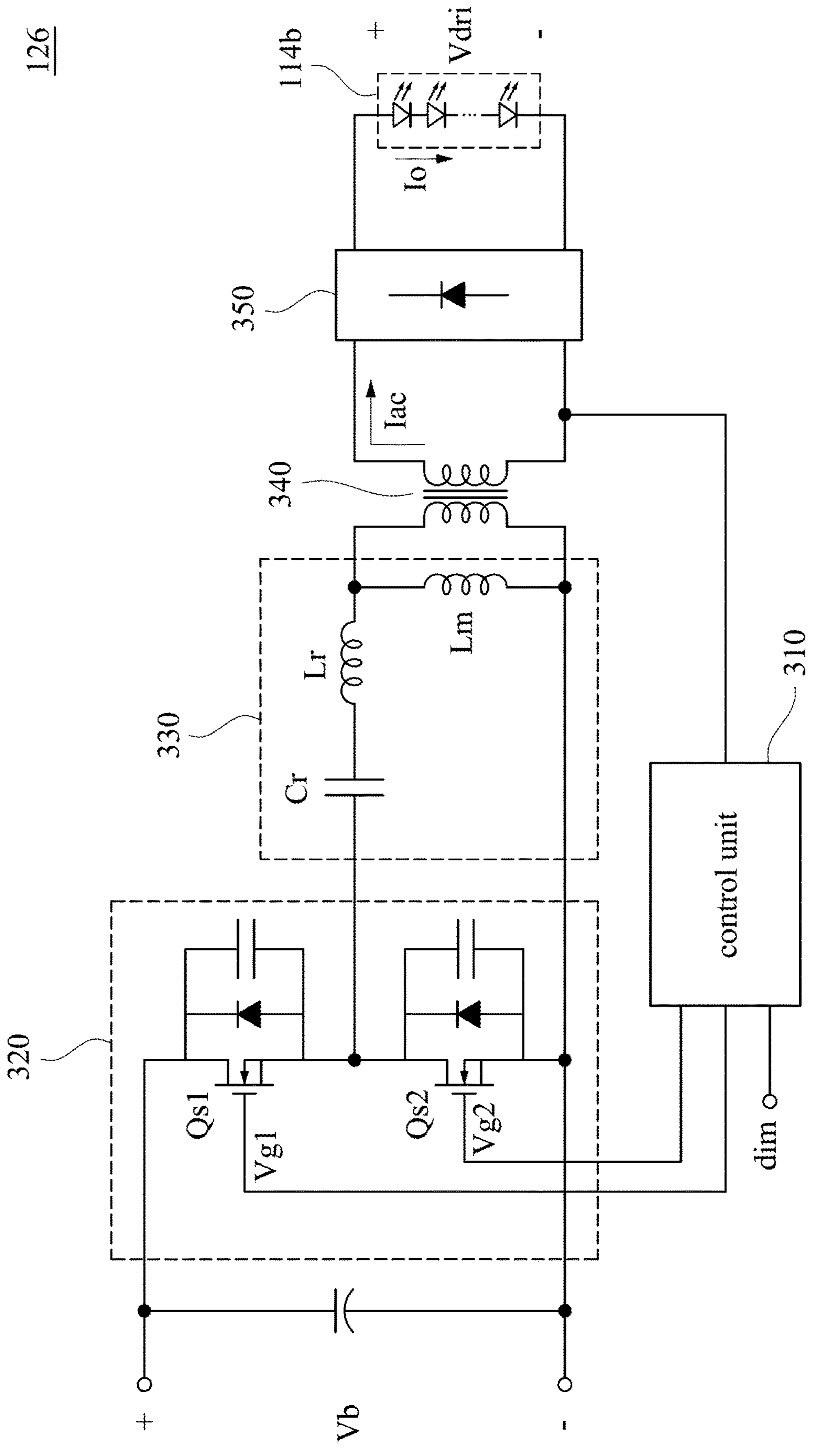
FIG. 5 is a schematic diagram of a pulse DC voltage/current generating circuit in FIG. 2 in accordance with one embodiment of the present disclosure.
Figure 6A:
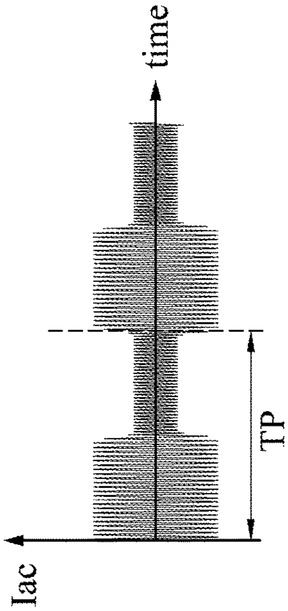
FIG. 6A is a schematic diagram of a waveform of the current in FIG. 5.
Figure 6B:
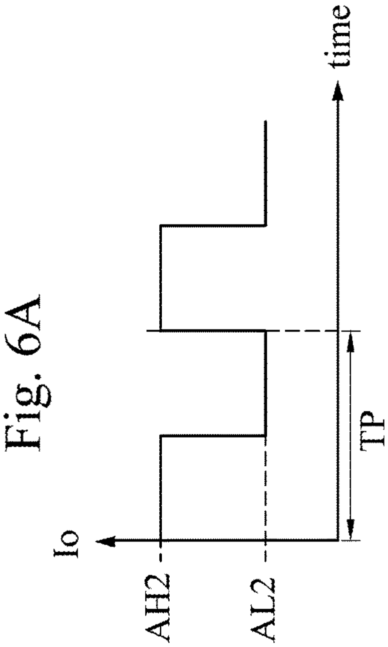
FIG. 6B is a schematic diagram of a waveform of the current in FIG. 5.

Reference is made to FIGS. 5, 6A-6B. FIG. 5 is a schematic diagram of a pulse DC voltage/current generating circuit 126 in FIG. 2 in accordance with one embodiment of the present disclosure. FIG. 6A is a schematic diagram of a waveform of the current lac in FIG. 5. FIG. 6B is a schematic diagram of a waveform of the current lo in FIG. 5. The pulse DC voltage/current generating circuit 126 includes a DC-AC conversion circuit 320, a resonant circuit 330, a power transformer 340, a rectifier circuit 350 and a control unit 310.

In some embodiments, the DC-AC conversion circuit 320 can be implemented by a half-bridge DC/AC converter, a full-bridge DC/AC converter or class-E converter. Therefore, it is not intended to limit the present disclosure. Correspondingly, in the embodiment of FIG. 5, the pulse DC voltage/current generating circuit 126 is an example. The pulse DC voltage/current generating circuit 126 of the light dimming circuit 120 can be implemented by other circuit able to generate the pulse DC voltage/current. Therefore, it is not intended to limit the present disclosure. The DC-AC conversion circuit 320 includes two power switches, which are power switches Qs1 and Qs2, configured to receive the input DV voltage Vb, and to convert the input DV voltage Vb to the AC voltage. The resonant circuit 330 is electrically coupled to the DC-AC conversion circuit 320, so as to receive the AC voltage, and to convert the AC voltage to a resonant voltage.

The resonant circuit 330 includes a resonant capacitor Cr and a LLC resonant circuit, formed by two inductors Lr and Lm. The power transformer 340 includes a primary winding and a secondary winding, the primary winding is electrically coupled to the resonant circuit 330 to receive the resonant voltage and output the AC driving voltage.

The control unit 310 receives an external light dimming control signal dim. The external light dimming control signal dim is a pulse signal provided by a microcontroller (not shown) or a pulse width modulation generation circuit. In the cycle TP, when the external light dimming control signal dim has a high logic level, the control unit 310 generates the control signals Vg1 and Vg2 to control the current lac oscillates at a relatively large amplitude, and provides the current lac to the rectifier circuit 350, such that the rectifier circuit 350 converts the current lac to the current lo (or the driving voltage Vdri) at a high logic level AH2; and when the external light dimming control signal dim has a low logic level, the control unit 310 generates the control signals Vg1 and Vg2 to control the current lac oscillates at a relatively small amplitude, such that the rectifier circuit 350 converts the current lac to the current lo (or the driving voltage Vdri) at a low logic level AL2, so as to drive the light emitting elements 114*b*, and perform the light dimming on the light emitting elements 114*b* by controlling the electric current, such that the light emitting elements 114*b* emits flickering-lights. In some embodiments, a pulse frequency of the external light dimming control signal dim can be set at 1~80 Hz (a time length of the cycle TP can be set at a range of 1 s~0.0125 s, correspondingly), and the light emitting elements 114*b* can emits flickering-lights at a corresponding flicker frequency. In some embodiments, the pulse frequency of the external light dimming control signal dim can be set at 40 Hz, such that the light emitting elements 114*b* can emits flickering-lights at a corresponding flicker frequency (e.g., 40 Hz). The light emitting elements 114*b* can correspond to the light emitting elements 114 in FIG. 2.

Figure 6C:
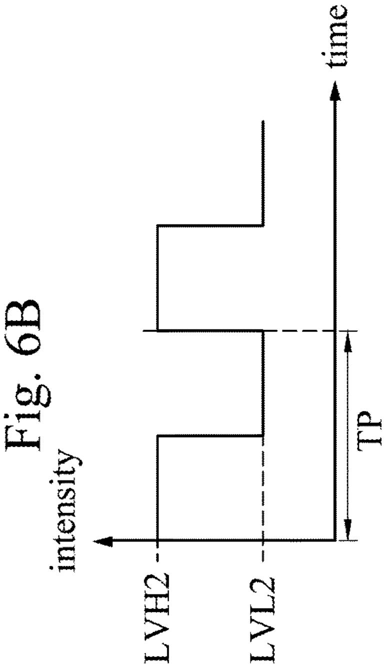
FIG. 6C is a schematic diagram of intensity of lights emitted by the light emitting elements driven by the pulse DC voltage/current generating circuit in FIG. 2 in accordance with one embodiment of the present disclosure.

Reference is made to FIG. 6C. FIG. 6C is a schematic diagram of intensity of lights emitted by the light emitting elements 114 driven by the pulse DC voltage/current generating circuit in FIG. 2 in accordance with one embodiment of the present disclosure. As shown in FIG. 6C, since the pulse DC voltage/current generating circuit 126 provides the pulse DC voltage/current to drive the light emitting elements 114 in the light board 110, the light emitting elements 114 emit flickering-lights flickering at an interval between a high intensity LVH2 and a low intensity LVL2 based on the said pulse DC voltage/current. The pulse cycle TP of the said pulse DC voltage/current correspond to the flickering cycle of the flickering-light emitted by the light emitting elements 114. Therefore, the flickering cycle/flicker frequency of the flickering-light emitted by the light emitting elements 114 can be controlled by setting the pulse cycle of the pulse DC voltage/current.

For example, the pulse DC voltage/current generating circuit 126 provides a pulse DC voltage/current with a flickering cycle 1/40 or 1/60 seconds, and the light emitting elements 114 correspondingly emit the flickering-lights at the flicker frequency of 40 Hz or 60 Hz. As a result, the light emitting elements 114 emits the flickering-lights at the certain flicker frequency.

In some embodiments, the flicker frequency of the flickering-lights emitted by the light emitting elements 114 can be set in a range of 1~80 Hz, so as to treat the related disease. In some embodiments, the flicker frequency of the flickering-lights emitted by the light emitting elements 114 can be set at 40 Hz, so as to treat, improve or prevent brain function decline, such as, degenerative nerve disease (e.g. Alzheimer's disease) or neurodegenerative disease.

In some embodiments, the light emitting elements 112 and 114 have the same specification, and maximum amplitudes of the electrical currents provided by the pure DC voltage/current generating circuit 124 and the pulse DC voltage/current generating circuit 126 are the same. Therefore, if a pure DC voltage/current generated by the pure DC voltage/current generating circuit 124 has a maximum value, high and low logic levels of the pulse DC voltage/current generated by the pulse DC voltage/current generating circuit 126 can be set in a range of 0~1 times of the maximum value of the pure DC voltage/current generated by the pure DC voltage/current generating circuit 124.

In some embodiments, a difference between the high logic level AH1 and the low logic level AL2 of the pulse DC voltage/current generated by the pulse DC voltage/current generating circuit 126 is less than ½ times of the amplitude of the pure DC voltage/current. In this case, the perceptible capability for perceiving the flicker by human's visual can be decreased, and the patient experience can be improved while maintaining the best effect of the treatment.

In other embodiments, a difference between the high logic level AH1 and the low logic level AL2 of the pulse DC voltage/current generated by the pulse DC voltage/current generating circuit 126 is less than ¼ times of the amplitude of the pure DC voltage/current. In this case, the perceptible capability for perceiving the flicker by human's visual can be rapidly decreased, so as to improve the patient experience during the treatment of the certain disease under a condition that the flicker will be hard to be perceptible by human visual system.

Figure 7B:
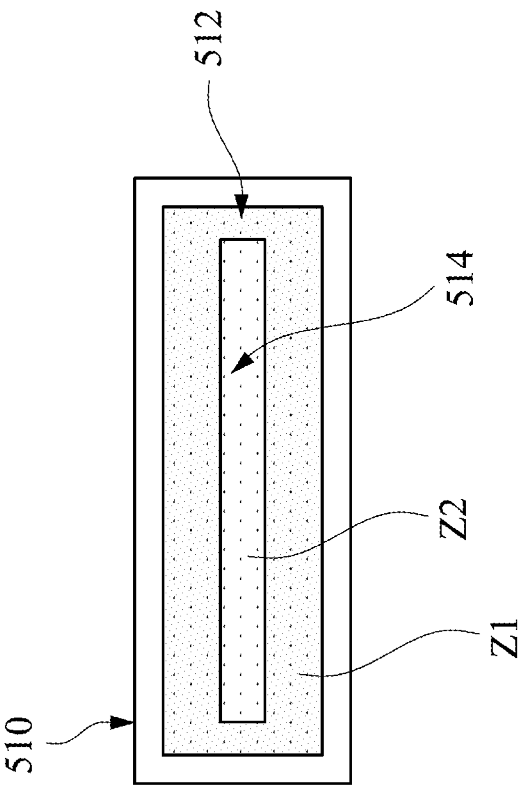
FIG. 7B is a schematic diagram of a light board in accordance with the other embodiment of the present disclosure.
Figure 7A:
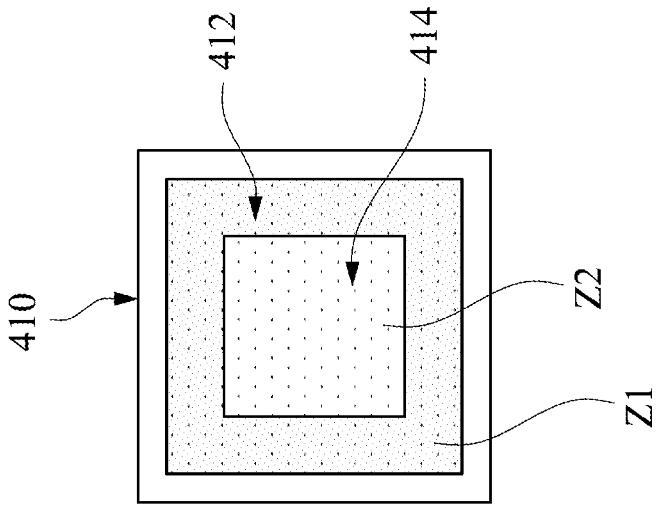
FIG. 7A is a schematic diagram of a light board in accordance with another embodiment of the present disclosure.

Reference is made to FIG. 7A. FIG. 7A is a schematic diagram of a light board 410 in accordance with another embodiment of the present disclosure. As shown in FIG. 7A, the light board 410 includes light emitting elements 412 disposed in a first area Z1 of the light board 410 and light emitting elements 414 disposed in a second area Z2 of the light board 410. In some embodiments, the light board 110 of the lighting device 100 in FIG. 2 can be implemented by the light board 410 shown in FIG. 7A. In the embodiments of FIG. 2, the light board 110 illustrated in a circle shape/structure is an embodiment. Compare to the light board 110 of the lighting device 100 in FIG. 2, the different of the light board 410 in FIG. 7A is that, the light board 410 can be designed in a square shape/structure. The other connection relationship and operation manner/function of the light emitting elements 412 and 414 in the light board 410 are respectively similar or equal to the light emitting elements 112 and 114 of the light board 110 in FIG. 2, and therefore the description is omitted here.

Reference is made to FIG. 7B. FIG. 7B is a schematic diagram of a light board 510 in accordance with the other embodiment of the present disclosure. As shown in FIG. 7B, the light board 510 includes light emitting elements 512 disposed in a first area Z1 of the light board 510 and light emitting elements 514 disposed in a second area Z2 of the light board 510. In some embodiments, the light board 110 of the lighting device 100 in FIG. 2 can be implemented by the light board 510 in FIG. 7B.

Compare to the light board 110 of the lighting device 100 in FIG. 2, the different of the light board 510 in FIG. 7B is that, the light board 510 can be designed in a rectangular shape/structure. The other connection relationship and operation manner/function of the light emitting elements 512 and 514 in the light board 510 are respectively similar or equal to the light emitting elements 112 and 114 of the light board 110 in FIG. 2, and therefore the description is omitted here.

To be noted that, although in the embodiments of FIGS. 2, 7A and 7B, the light emitting elements 112, 412 and 512 in the first area Z1 are surrounded around the light emitting elements 114, 414 and 514 in the second area Z2, but it is not intended to limit the present disclosure. In some embodiments, the first area Z1 for disposing the light emitting elements 112, 412 or 512 can be "U" shaped or two parallel lines shape surrounded around the second area Z2 for disposing the light emitting elements 114, 414 or 514, such the light emitting elements 114, 414 or 514 can be disposed in the middle of the light board 110, 410 or 510. In some embodiments, the arrangement relationship between the light emitting elements 112, 412 or 512 in the first area Z1 and the light emitting elements 114, 414 or 514 in the second area Z2 is a parallel configuration instead of the surround configuration.

Figure 8:
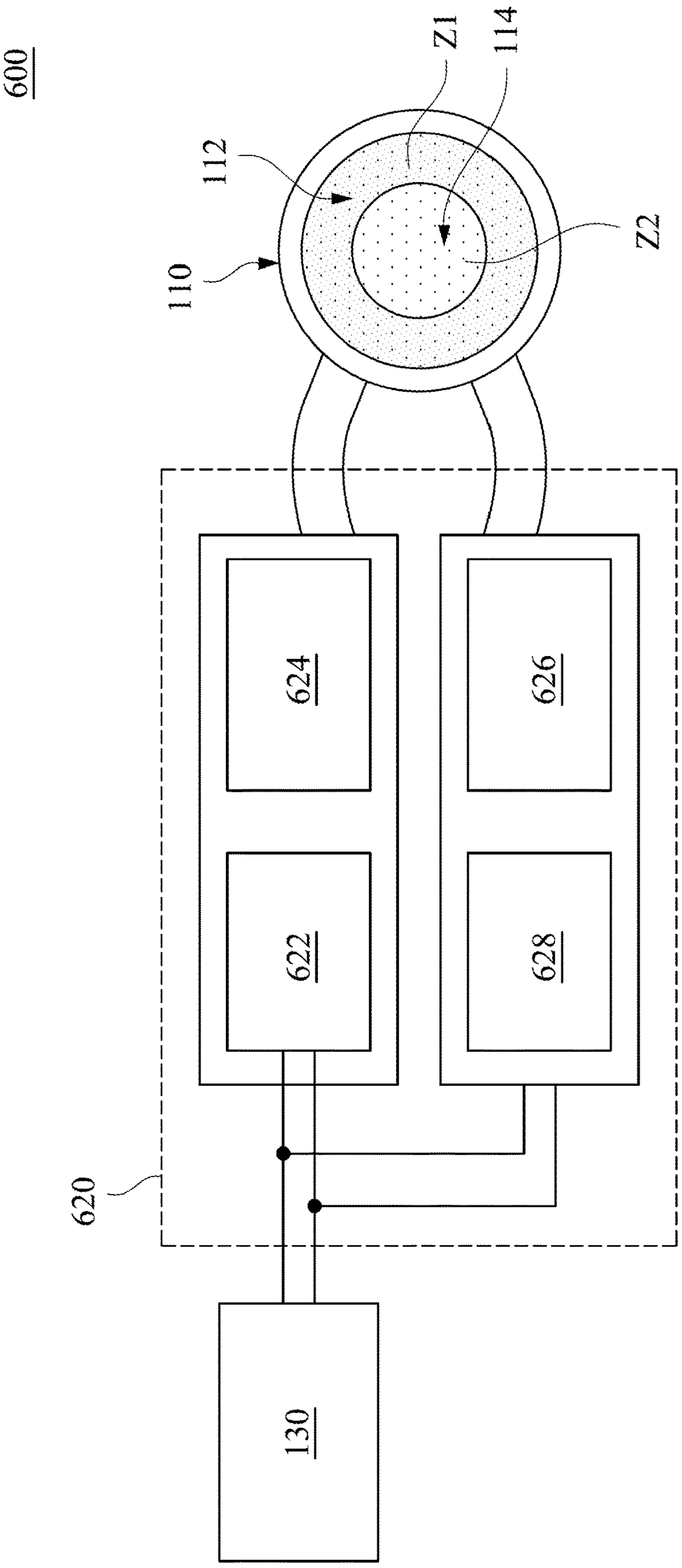
FIG. 8 is a function block of a lighting device in accordance with another embodiment of the present disclosure.

Reference is made to FIG. 8. FIG. 8 is a function block of a lighting device 600 in accordance with another embodiment of the present disclosure. As shown in FIG. 8, the lighting device 600 includes a power supply circuit 130, a light dimming circuit 620 and a light board 110. The light dimming circuit 620 includes power conversion circuits 622 and 628, a pure DC voltage/current generating circuit 624 and a pulse DC voltage/current generating circuit 626.

Compare to the light dimming circuit 120 of the lighting device 100 in FIG. 2, the different of the light dimming circuit 620 in FIG. 7B is that, the number of the power conversion circuits. Specifically, the light dimming circuit 620 includes the power conversion circuits 622 and 628. In structure, the power supply circuit 130 is electrically coupled to the power conversion circuit 622, and the power conversion circuit 622 is electrically coupled to the pure DC voltage/current generating circuit 624. The pure DC voltage/current generating circuit 624 is electrically coupled to the light emitting elements 112 disposed in the light board 110. In function, the power conversion circuit 622 is configured to converts the power provided by the power supply circuit 130 to the DC voltage and provides the DC voltage to the pure DC voltage/current generating circuit 624, such that the pure DC voltage/current generating circuit 624 generates the pure DC voltage/current to drive the light emitting elements 112 in the light board 110 to emit the non-flickering lights.

Similarly, the power supply circuit 130 is electrically coupled to the power conversion circuit 628, the power conversion circuit 628 is electrically coupled to the pulse DC voltage/current generating circuit 626, and the pulse DC voltage/current generating circuit 626 is electrically coupled to the light emitting elements 114 in the light board 110. In function, the power conversion circuit 628 is configured to convert the power provided by the power supply circuit 130 to the DC voltage and provides the DC voltage to the pulse DC voltage/current generating circuit 626, such that the pulse DC voltage/current generating circuit 626 generates pulse DC voltage/current to drive the light emitting elements 114 in the light board 110 to emit the flickering lights.

The other connection relationship and operation manner/function of the power conversion circuits 622 and 628, the pure DC voltage/current generating circuit 624 and the pulse DC voltage/current generating circuit 626 in the light dimming circuit 620 are respectively similar/equal to the power conversion circuit 122, the pure DC voltage/current generating circuit 124 and the pulse DC voltage/current generating circuit 126 in the light dimming circuit 120 in FIG. 2, and therefore the description is omitted here.

Figure 9:
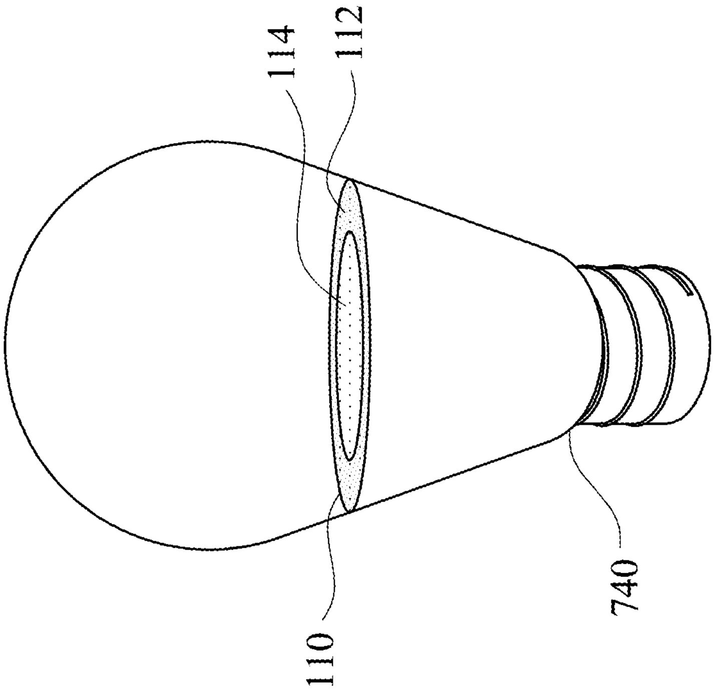
FIG. 9 is a schematic diagram of a bulb shape lamp in accordance with an embodiment of the present disclosure.

FIG. 9 is a schematic diagram of a bulb lamp 740 in accordance with an embodiment of the present disclosure. As shown in FIG. 9, the lamp 740 is implemented by a light bulb, and the light board 110 in a circle shape can be disposed in the bulb lamp 740. In other embodiments, the light board disposing in the bulb lamp 740 can be replaced by the light board 410 in a square shape. Therefore, it is not intended to limit the present disclosure.

Figure 10:
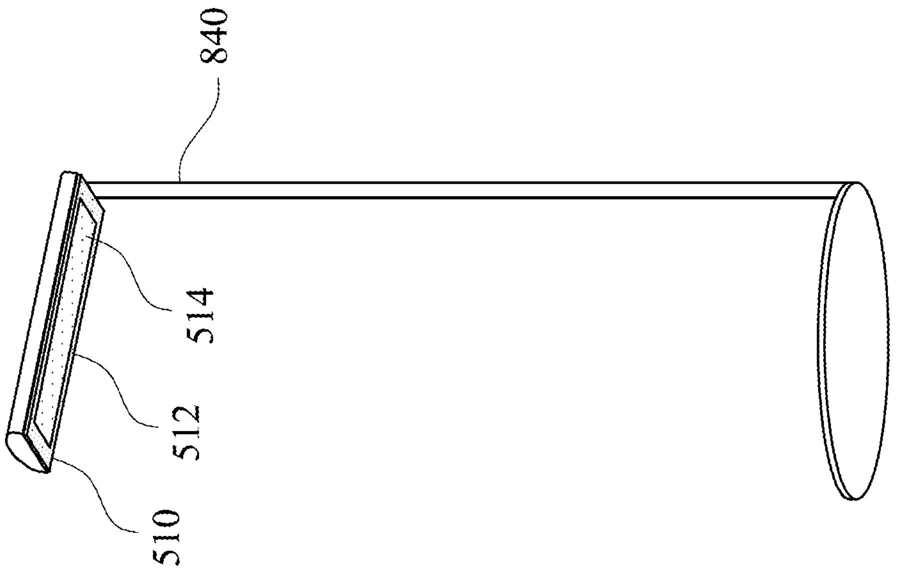
FIG. 10 is a schematic diagram of a floor lamp in accordance with an embodiment of the present disclosure.

FIG. 10 is a schematic diagram of a floor lamp 840 in accordance with an embodiment of the present disclosure. As shown in FIG. 10, the lamp 840 is a floor lamp, and the light board 510 in a rectangular shape can be disposed in the lamp 840. In other embodiments, the light board disposing in the floor lamp 840 can be replaced by the light board 410 in a square shape or the light board 110 in a circle shape. Therefore, it is not intended to limit the present disclosure.

Figure 11:
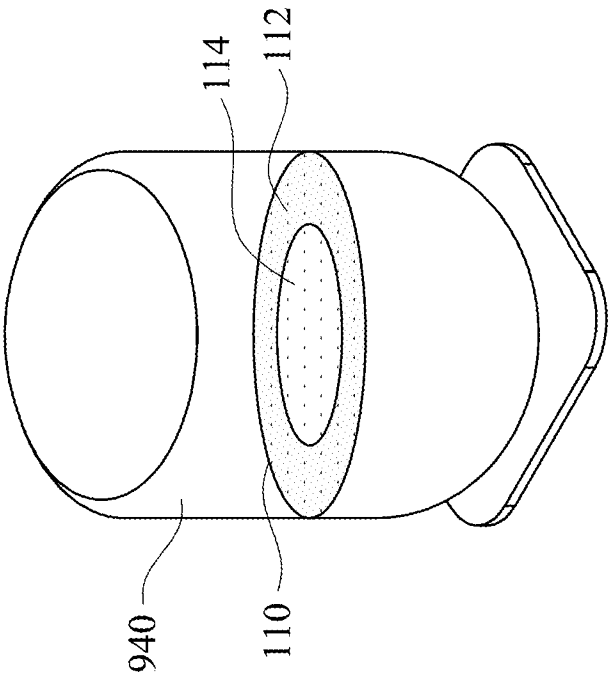
FIG. 11 is a schematic diagram of a desk lamp in accordance with an embodiment of the present disclosure.

FIG. 11 is a schematic diagram of a desk lamp 940 in accordance with an embodiment of the present disclosure. As shown in FIG. 11, the lamp 940 is a desk lamp, and the light board 110 in a circle shape can be disposed in the lamp 940. In other embodiments, the light board disposing in the desk lamp 940 can be replaced by the light board 410 in a square shape or the light board 510 in a rectangular shape. Therefore, it is not intended to limit the present disclosure.

Figure 12:
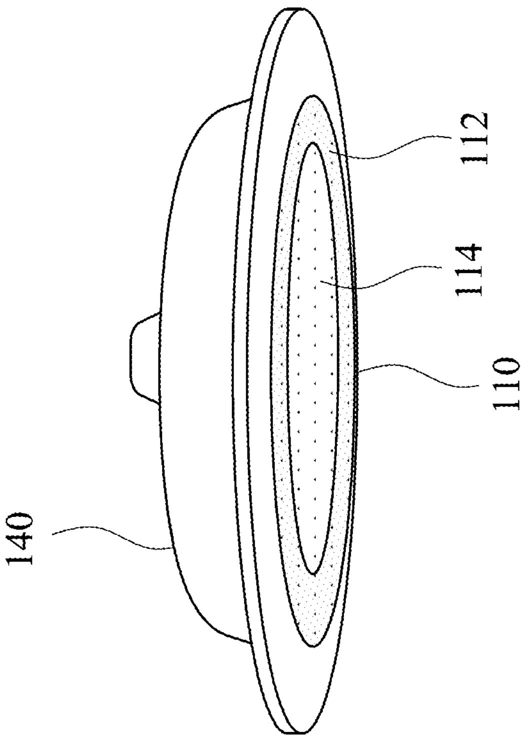
FIG. 12 is a schematic diagram of a recessed lamp in accordance with an embodiment of the present disclosure.

FIG. 12 is a schematic diagram of a recessed lamp 140 in accordance with an embodiment of the present disclosure. As shown in FIG. 12, the lamp 140 is a recessed lamp, and the light board 110 in a circle shape can be disposed in the recessed lamp 140. In other embodiments, the light board disposing in the recessed lamp 140 can be replaced by the light board 410 in a rectangular shape. Therefore, it is not intended to limit the present disclosure. To be noted that, in the embodiments of FIG. 1, the lamp 140 of the lighting device 100 can be replaced by the lamp 740, 840, 940 in FIGS. 9 to 11, or other kind of lamps. Therefore, it is not intended to limit the present disclosure.

Summary, the present disclosure utilizes the light dimming circuit to drive the light emitting elements 112 to emit non-flicker lights and the light emitting elements 114 to emit flicker lights, which are disposed in the same light board. The light emitting elements 114 are controlled to emit flickering lights at a certain flicker frequency can increase the treatment effect for specific disease, and the light emitting elements 112 are controlled to emit non-flickering lights can decrease the human visual perception for the flickering lights, such that the patient experience during the treatment can be improved.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lighting device, comprising:

a light board, comprising:

a plurality of first light emitting elements, disposed in a first area of the lighting device; and a plurality of second light emitting elements, disposed in a second area of the lighting device; and a light dimmer circuit, configured to drive the second light emitting elements to generate flickering lights from the second area of the lighting device, and configured to drive the first light emitting elements to generate non-flickering lights from the first area of the lighting device, and wherein the light dimmer circuit comprises:

a pure DC current generating circuit, configured to generate a pure DC current to directly drive the first light emitting elements to emit the non-flickering lights; and a pulse DC current generating circuit, configured to generate a pulse DC current to directly drive the second light emitting elements to emit the flickering lights, wherein a pulse frequency of the pulse DC current corresponds to a flicker frequency of the flickering lights, wherein a difference between high logic level and low logic level of the pulse DC current is less than ½ times of an amplitude of the pure DC current.

2. The lighting device of claim 1, wherein the flickering lights have the flicker frequency, wherein the flicker frequency is a frequency perceptible by human visual system.

3. The lighting device of claim 1, wherein the first area is surrounded around the second area.

4. The lighting device of claim 1, wherein a difference between high logic level and low logic level of the pulse DC current is less than ¼ times of an amplitude of the pure DC current.

5. The lighting device of claim 1, wherein logic level of the pulse DC current is set in a range of 0~1 times of an amplitude of the pure DC current.

6. The lighting device of claim 1, wherein the flicker frequency is set in a range of 1 Hz-80 Hz.

7. The lighting device of claim 1, wherein the first light emitting elements have a specification same with the second light emitting elements.

8. The lighting device of claim 1, wherein the non-flickering lights comprise a non-visible-flicker, wherein the non-visible-flicker is hard to be perceptible by human visual system.

9. A lighting device, comprising:

a light board, comprising a plurality of first light emitting elements and a plurality of second light emitting elements; and a light dimmer circuit, configured to drive the first light emitting elements by a pure DC current, and configured to drive the second light emitting elements by a pulse DC current, wherein the light dimmer circuit comprises: a pure DC current generating circuit, configured to generate the pure DC current to directly drive the first light emitting elements to emit non-flickering lights; and a pulse DC current generating circuit, configured to generate the pulse DC current to directly drive the second light emitting elements to emit flickering lights, wherein a pulse frequency of the pulse DC current corresponds to a flicker frequency of the flickering lights, and wherein a difference between high logic level and low logic level of the pulse DC current is less than ½ times of an amplitude of the pure DC current.

10. The lighting device of claim 9, wherein the light dimmer circuit is configured to drive the first light emitting elements with the pure DC current to emit non-flickering lights, and the light dimmer circuit is configured to drive the second light emitting elements with the pulse DC current to emit flickering lights.

11. The lighting device of claim 10, wherein the flickering lights have a flicker frequency, wherein the flicker frequency is perceptible by human visual system.

12. The lighting device of claim 9, wherein a difference between high logic level and low logic level of the pulse DC current is less than ¼ times of an amplitude of the pure DC current.

13. The lighting device of claim 9, wherein logic level of the pulse DC current is set in a range of 0~1 times of an amplitude of the pure DC current.

14. The lighting device of claim 9, wherein the flicker frequency is set in a range of 1 Hz-80 Hz.

15. The lighting device of claim 9, wherein the first light emitting elements have a specification same with the second light emitting elements.

16. The lighting device of claim 9, the non-flickering lights comprises non-visible-flicker, wherein the non-visible-flicker is hard to be perceptible by human visual system.

* * * * *